(12) United States Patent
Dever et al.

(10) Patent No.: US 10,284,897 B1
(45) Date of Patent: May 7, 2019

(54) SYSTEMS AND METHODS FOR MODIFYING THE DISPLAY OF INPUTS ON A USER INPUT DEVICE

(71) Applicant: Rovi Guides, Inc., San Jose, CA (US)

(72) Inventors: Sara Dever, Boothwyn, PA (US); Jennifer L. Holloway, Wallingford, PA (US); Daniel P. Rowan, Springfield, PA (US); Mark D. Thompson, Havertown, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/938,341

(22) Filed: Mar. 28, 2018

(51) Int. Cl.
*G06F 3/00* (2006.01)
*G06F 13/00* (2006.01)
*H04N 5/445* (2011.01)
*H04N 21/422* (2011.01)
*G06F 8/65* (2018.01)

(52) U.S. Cl.
CPC ......... *H04N 21/42228* (2013.01); *G06F 8/66* (2013.01); *H04N 21/4222* (2013.01); *H04N 21/42224* (2013.01)

(58) Field of Classification Search
CPC ......... H04N 21/42228; H04N 21/4222; H04N 21/42224; G06F 8/66
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,401,300 B2 | 7/2008 | Nurmi | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2005/0251827 A1 | 11/2005 | Ellis et al. | |
| 2007/0124772 A1* | 5/2007 | Bennett ............. | G11B 19/027 725/61 |
| 2010/0153313 A1 | 6/2010 | Baldwin et al. | |
| 2010/0153885 A1 | 6/2010 | Yates | |
| 2011/0187491 A1* | 8/2011 | Innes .................. | G05B 19/02 340/4.3 |

* cited by examiner

*Primary Examiner* — Kyu Chae
(74) *Attorney, Agent, or Firm* — Haley Guiliano LLP

(57) ABSTRACT

Systems and methods are described for adapting a second user input device to resemble a first user input device while preserving new functionalities not available in the first user input device. The systems and methods may identify, based on identifiers of the first and second user input devices, a first and second set of device functionalities provided by the devices. The systems and methods may compare the sets of device functionalities to determine a set of common device functionalities and, in response, modify the display of an input of the second user input device to correspond to visual attributes of an input of the first user input device.

20 Claims, 8 Drawing Sheets

SYSTEMS AND METHODS FOR MODIFYING THE DISPLAY OF INPUTS ON A USER INPUT DEVICE

BACKGROUND

As media systems have become more advanced and interactive, the variety of media devices available to users has increased. Newer devices are different than older devices in both device functionality as well as device interface design. Many of these newer devices provide touchscreen capabilities that allow users to input device commands. However, users are often unfamiliar with the newer touchscreen input devices and do not know how to use them.

SUMMARY

Touchscreen input devices may now have displays that visually resemble older input devices that users are more familiar with. However, the functionalities available with newer touchscreen input devices far surpass those available with older input devices (e.g., remote controls). Thus, a newer touchscreen input device simply mirroring an older input device will result in a loss of functionality for users, as the additional functionalities available to the newer device would be lost. It would be advantageous to modify the display of only the inputs of the newer touchscreen input device that have a common device functionality with the inputs of the older input device. This would aid users unfamiliar with the new input device by presenting a more accessible interface to the user while preserving the improved functionality of the new input device.

Accordingly, to overcome problems with user familiarity with a newer device while maintaining the improved functionality of the newer device, systems and methods are described herein for adapting a second user input device to resemble a first user input device while preserving new functionalities not available in the first user input device. Specifically, a media guidance application may retrieve an identifier of a first user input device associated with a first user equipment device, where the first user equipment device was previously associated with the user. For example, the media guidance application may retrieve a hexadecimal code that identifies a remote control device associated with a set-top box, where the set-top box was previously associated with the user.

The media guidance application may retrieve an identifier of a second user input device associated with a second user equipment device, where the second user equipment device has been newly associated with the user, and where the second user input device comprises a display of inputs for performing respective device functions. For example, the media guidance application may retrieve a hexadecimal code that identifies a tablet computer device associated with a different set-top box, where the different set-top box has been newly associated with the user, and where the tablet computer device has a touchscreen display for inputs that enable user input to the different set-top box. By retrieving identifiers of the first and second user input devices, the media guidance application may retrieve additional attributes of the user input devices that may facilitate the adaptation of the second user input device to resemble the first user input device.

The media guidance application may identify, based on the first identifier and the second identifier, respectively, a first set of device functionalities provided by the first user input device and a second set of device functionalities provided by the second user input device. For example, the media guidance application may identify, from using the hexadecimal code identifier of the remote control device, a first set of device functionalities for the remote control device, including power, play, pause, and stop functionalities. Similarly, the media guidance application may identify, from using the hexadecimal code identifier of the tablet computer device, a second set of device functionalities for the tablet computer device, including power, play, pause, stop, rewind, and fast-forward functionalities. By identifying sets of functionalities provided by the first and second user input devices, the media guidance application may identify the device functionalities that the user input devices have in common and the device functionalities that are exclusive to the second user input device.

The media guidance application may compare the first set of device functionalities with the second set of device functionalities and determine, based on the comparing, a set of common device functionalities. For example, the media guidance application may compare the first set, including power, play, pause, and stop device functionalities, with the second set, including power, play, pause, stop, rewind, and fast-forward device functionalities, and determine a set of common device functionalities to include the power, play, pause, and stop functionalities. Determining a set of common device functionalities enables the media guidance application to identify inputs of the second user input device that correspond to the set of common device functionalities and may be adapted to resemble inputs of the first user input device.

The media guidance application may modify the display of a first input of the inputs corresponding to a first device functionality of the common device functionalities to resemble visual attributes of a button of the first user input device associated with the first overlapping device functionality. For example, the media guidance application may modify the display of an input of the tablet computer device corresponding to the power functionality to resemble visual attributes of a button of the remote control device associated with the power functionality. For example, the media guidance application may modify the display of the input of the tablet computer device by changing the shape of the display of the input to a round shape corresponding to the round shape of the button of the remote control device. The user may more easily recognize and use inputs on the second device that visually resemble inputs on the first device. As a result, the user may have a better experience adapting to the unfamiliar newer device.

In some embodiments, the media guidance application may receive, from a user, a request to modify a display of inputs of a second user input device to correspond to inputs of a first user input device. For example, the user may transmit a request (e.g., via a web interface) to modify the display of inputs of a tablet computer device to correspond to input buttons of a remote control device.

In some embodiments, the media guidance application may receive, from the user, a request to modify a display of inputs of the second user input device, without an indication of a first user input device. For example, the media guidance application may receive, from the user, a request to modify the display of inputs of a tablet computer device. The media guidance application may retrieve a user profile comprising a listing of user input devices associated with the user, where the listing comprises a device identifier and timestamp of usage for each device. For example, the media guidance application may retrieve (e.g., from a database), a user profile comprising a list that includes a remote control device with timestamp T1, the tablet computer device with timestamp T2, and a mobile device with timestamp T3, where T1 is earlier than T2 and T2 is earlier than T3.

The media guidance application may select, from the listing, a first user input device that has a timestamp of usage that is earlier than the timestamp of usage of the second user input device. For example, the media guidance application may select the remote control device with timestamp T1 to be the first user input device. The timestamp for each user input device may represent, for example, the point in time at which the user input device was registered with the media guidance system, the point in time at which the user input device was first used for more than a threshold amount of time, the point in time at which the user input device was most recently used, or another point in time. By selecting a first user input device that has an earlier timestamp than the second user input device, the media guidance application supplements the user request to modify the display of inputs of the second user input device by selecting a device with more familiar inputs (the first user input device) to model the display of the second user input device after.

In some embodiments, in response to the request from the user to modify a display of inputs of a second user input device, the media guidance application may retrieve a user profile comprising a listing of user input devices associated with the user, where the listing comprises a device identifier and usage amount for each user input device. For example, in response to the request from the user to modify the display of inputs of the tablet computer device, the media guidance application may retrieve a user profile comprising a list that includes a remote control device with usage amount A1, the tablet computer device with usage amount A2, and a mobile device with usage amount A3, where A1 is less than A2 and A2 is less than A3. The media guidance application may select, from the listing, a first user input device that has a usage amount that is greater than the usage amount of the second user input device. For example, the media guidance application may select the mobile device with usage amount A3 to be the first user input device. By selecting a first user input device that has a greater usage amount than the second user input device, the media guidance application supplements the user request to modify the display of inputs of the second user input device by selecting a device with more familiar inputs (the first user input device) to model the display of the second user input device after.

In some embodiments, the media guidance application may retrieve (e.g., from the user profile) a first identifier of the first user input device and a second identifier of the second user input device. For example, the media guidance application may retrieve, as the first identifier, a hexadecimal code associated with the remote control device, and as the second identifier, a hexadecimal code associated with the tablet computer device.

The media guidance application may input the first identifier into a first database comprising device functionalities and input maps of the first user input device to determine a first set of device functionalities of the first user input device and a first input map of the first user input device, where the first input map comprises visual attributes of the inputs of the first user input device. For example, the media guidance application may input the first identifier of the remote control device into a first database to determine a set of device functionalities and a first input map of the remote control device. The first input map may comprise a data structure comprising an identifier, visual attributes, and a corresponding device functionality for each input of the first user input device. For example, the first input map of the remote control device may include a device identifier such as the first identifier, visual attributes of the inputs of the remote control device, and a mapping of each input to a corresponding device functionality. In some embodiments, the visual attributes for each input of the first user input device comprise at least one of a shape, a color scheme, a size, a font face, a spatial position, and/or a style identifier. A font face may include, for example, attributes for a typeface (i.e., a particular design of type), a size, and/or a weight. For example, if there are two inputs of the first user input device, one input may have visual attributes including a square shape and a color scheme of red text and black background coloring, and the other input may have a visual attribute of a sans serif font face.

The media guidance application may input the second identifier into a second database comprising device functionalities and input maps of the second user input device to determine a second set of device functionalities of the second user input device and a second input map of the second user input device, where the second input map comprises visual attributes of the inputs of the second user input device. For example, the media guidance application may input the second identifier of the tablet computer device into a second database to determine a set of device functionalities and a second input map of the tablet computer device. The second input map may comprise a data structure comprising an identifier, visual attributes, and a corresponding device functionality for each input of the second user input device. For example, the second input map of the tablet computer device may include a device identifier such as the second identifier, visual attributes of the inputs of the tablet computer device, and a mapping of each input to a corresponding device functionality. In some embodiments, the visual attributes for each input of the second user input device comprise at least one of a shape, a color scheme, a size, a font face, a spatial position, and/or a style identifier. For example, if there are two inputs of the second user input device, one input may have a visual attribute of a round shape, and the other input may have a visual attribute of a size of 30 square pixels.

The media guidance application may compare the first set of device functionalities with the second set of device functionalities and determine, based on the comparing, a set of common device functionalities. For example, the remote control device may have the following first set of device functionalities: power, play, pause, and stop. The tablet computer device may have the following second set of device functionalities: power, play, pause, stop, rewind, and fast-forward. In this example, the media guidance application may compare the first set of device functionalities with the second set of device functionalities and determine the set of common device functionalities to be power, play, pause, and stop. By determining which device functionalities are common to both the newer and the older user input devices, the media guidance application may determine which corresponding inputs of the second (newer) user input device can be modified to visually resemble inputs of the first (older) user input device.

In some embodiments, the media guidance application may compare the first set of device functionalities with the second set of device functionalities by comparing a first device functionality from the first set with a second device functionality from the second set and determining whether, at a given state for a given user equipment device, executing the first device functionality would result in a same output state of the given user equipment device as executing the second device functionality. For example, the media guidance application may compare the power device functionality from the first set of device functionalities with the power device functionality from the second set of device functionalities and determine whether, at a given state for a given user equipment device (e.g., a set-top box), executing the first power device functionality would result in a same output state of the given user equipment device as executing the second power device functionality. For example, the media guidance application may determine whether, at an "on" state of a set-top box associated with the remote control device and tablet computer device, executing the first power device functionality of the remote control device would result in the same state (e.g., an "off" state) as executing the second power device functionality of the tablet computer device. The media guidance application may make this determination for each possible pairing of inputs from the first user input device and the second user input device.

In some embodiments, in response to determining that, at a given state for a given user equipment device, executing the first device functionality would result in the same output state as executing the second device functionality, the media guidance application may add the first device functionality to the set of common device functionalities. For example, in response to determining that, at an "on" state of a set-top box, executing the first power device functionality of the remote control device would result in a same "off" state as executing the second power device functionality of the tablet computer device, the media guidance application may add the power device functionality to a set of common device functionalities between the remote control device and the tablet computer device.

In response to determining the set of common device functionalities, the media guidance application may retrieve a first input of the first user input device that corresponds to a first device functionality in the set of common device functionalities and a second input of the second user input device that corresponds to the first device functionality in the set of common device functionalities. For example, the media guidance application may retrieve a first input of the remote control device that corresponds to the first power device functionality and a second input of the tablet computer device that corresponds to the first power device functionality.

In some embodiments, the media guidance application may retrieve a first input of the first user input device that corresponds to a first device functionality in the set of common device functionalities and a second input of the second user input device that corresponds to a second device functionality in the set of common device functionalities. For example, the media guidance application may retrieve a first input of the remote control device that corresponds to the first power device functionality and a second input of the tablet computer device that corresponds to, for example, a "change mode" device functionality.

The media guidance application may modify visual attributes of the second input of the second user input device to correspond to visual attributes of the first input of the first user input device. For example, the media guidance application may modify the shape and font face of the input corresponding to the first power device functionality of the tablet computer device to correspond to the shape and font face of the input corresponding to the first power device functionality of the remote control device. In another example, where the first input is the input of the remote control device that corresponds to the first power device functionality and the second input is the input of the tablet computer device that corresponds to a "change mode" device functionality, the media guidance application may modify the color scheme of the second input to correspond to the color scheme of the first input. By modifying visual attributes of the second input to correspond to visual attributes of the first input, the second input is presented in a more familiar way to the user, who may not have recognized the device functionality of the second input with unfamiliar visual attributes.

In some embodiments, the media guidance application may determine an exclusive set of device functionalities that are in the second set of device functionalities and not in the first set of device functionalities. For example, if the first set of device functionalities includes power, play, pause, and stop, and the second set of device functionalities includes power, play, pause, stop, rewind, and fast-forward, the media guidance application may determine the exclusive set of device functionalities that are in the second set and not the first set to include the rewind and fast-forward device functionalities.

The media guidance application may retrieve a third input of the second user input device that corresponds to a third device functionality in the exclusive set of device functionalities. For example, the media guidance application may retrieve a third input of the tablet computer device that corresponds to the rewind device functionality.

The media guidance application may modify visual attributes of the third input of the second user input device to correspond to visual attributes of the first input of the first user input device. For example, the media guidance application may modify the size and color scheme of the input of the tablet computer device that corresponds to the rewind device functionality to correspond to the size and color scheme of the input of the remote control device that corresponds to, for example, a play device functionality. By modifying the visual attributes of inputs of the second user input device that correspond to the set of exclusive device functionalities, the media guidance application may present the user with a more familiar interface for a new device functionality, which both improves accessibility of the new user input device and preserves the additional functionality of the new user input device, thereby improving user experience.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 2:
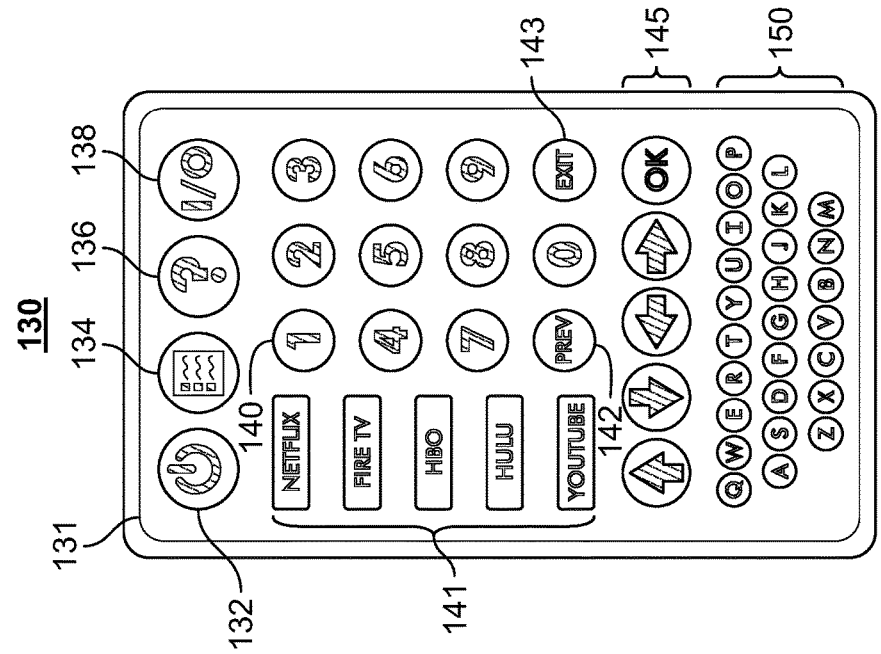
FIG. 2 shows a second user input device with a touchscreen display and touchscreen inputs associated with various device functionalities, in accordance with some embodiments of the disclosure.
Figure 1:
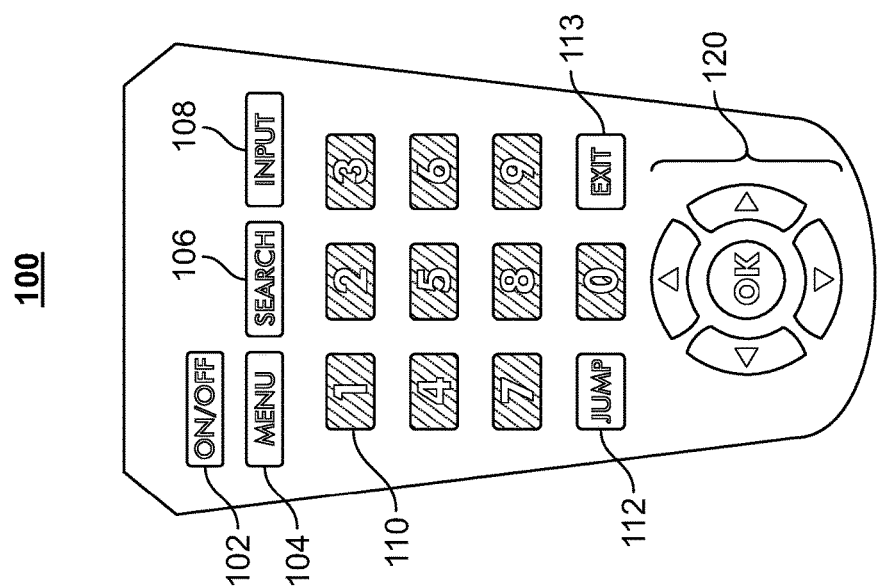
FIG. 1 shows a first user input device with inputs associated with various device functionalities, in accordance with some embodiments of the disclosure.
Figure 3:
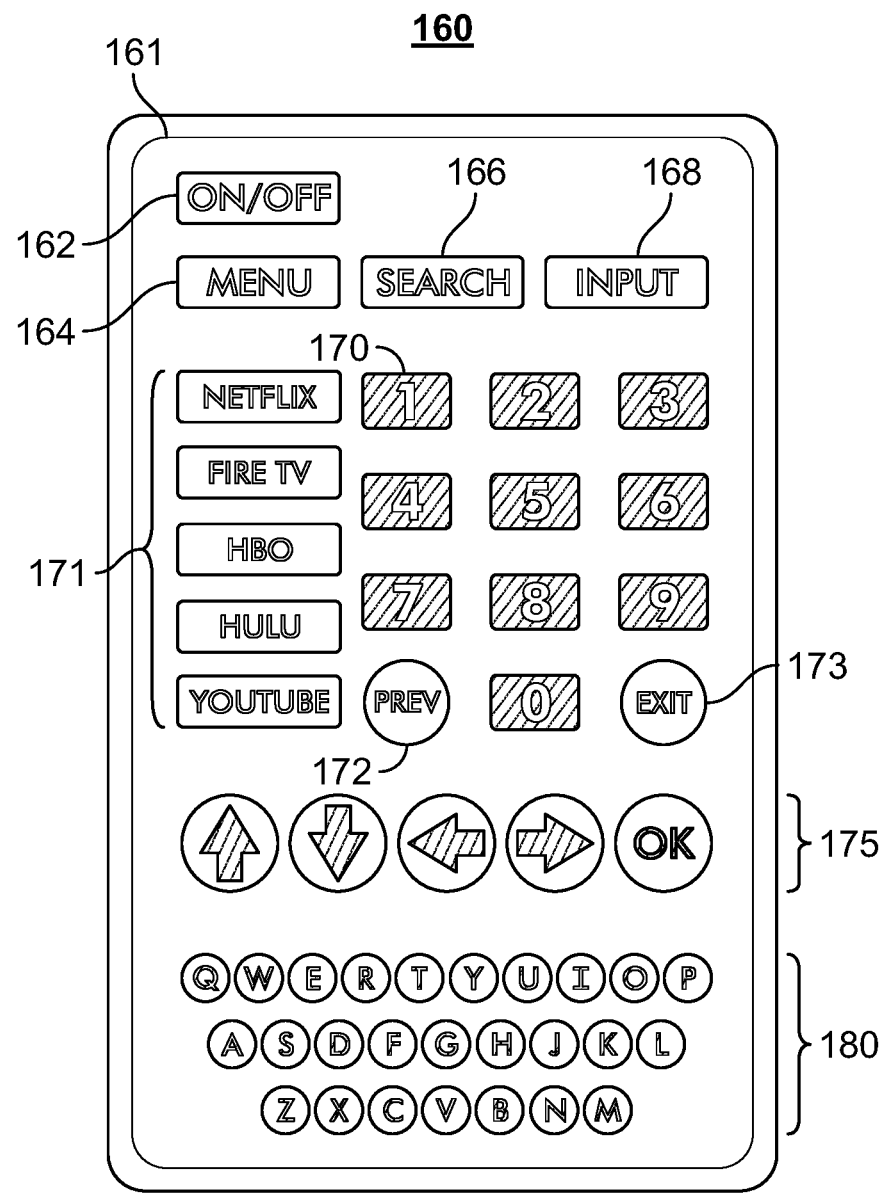
FIG. 3 shows the second user input device with touchscreen inputs of the touchscreen display modified to visually correspond to the inputs of first user input device, in accordance with some embodiments of the disclosure.

Systems and methods are described herein for adapting a second user input device to resemble a first user input device while preserving new functionalities not available in the first user input device. FIG. 1 shows an exemplary first user input device 100 with inputs associated with various device functionalities, in accordance with some embodiments of the disclosure. FIG. 2 shows an exemplary second user input device 130 with touchscreen display 131 and touchscreen inputs associated with various device functionalities, in accordance with some embodiments of the disclosure. A media guidance application may retrieve an identifier of the first user input device associated with a first user equipment device, where the first user equipment device was previously associated with the user. For example, the media guidance application may retrieve a hexadecimal code that identifies remote control device 100 associated with a set-top box, where the set-top box was previously associated with the user. The media guidance application may retrieve an identifier of the second user input device associated with a second user equipment device, where the second user equipment device has been newly associated with the user, and where the second user input device comprises a display of inputs for performing respective device functions. For example, the media guidance application may retrieve a hexadecimal code that identifies tablet computer device 130 associated with a different set-top box, where the different set-top box has been newly associated with the user, and where the tablet computer device has a touchscreen display for inputs that enable user input to the different set-top box. By retrieving identifiers of the first and second user input devices, the media guidance application may retrieve additional attributes of the user input devices that may facilitate the adaptation of the second user input device to resemble the first user input device. The media guidance application may identify, based on the first identifier and the second identifier, respectively, a first set of device functionalities provided by the first user input device and a second set of device functionalities provided by the second user input device. For example, the media guidance application may identify, from using the hexadecimal code identifier of the remote control device, a first set of device functionalities for the remote control device, including power, play, pause, and stop functionalities. Similarly, the media guidance application may identify, from using the hexadecimal code identifier of the tablet computer device, a second set of device functionalities for the tablet computer device, including power, play, pause, stop, rewind, and fast-forward functionalities. By identifying sets of functionalities provided by the first and second user input devices, the media guidance application may identify the device functionalities that the user input devices have in common and the device functionalities that are exclusive to the second user input device. The media guidance application may compare the first set of device functionalities with the second set of device functionalities and determine, based on the comparing, a set of common device functionalities. For example, the media guidance application may compare the first set, including power, play, pause, and stop device functionalities, with the second set, including power, play, pause, stop, rewind, and fast-forward device functionalities, and determine a set of common device functionalities to include the power, play, pause, and stop functionalities. Determining a set of common device functionalities enables the media guidance application to identify inputs of the second user input device that correspond to the set of common device functionalities and may be adapted to resemble inputs of the first user input device. The media guidance application may modify the display of a first input of the inputs corresponding to a first device functionality of the common device functionalities to resemble visual attributes of a button of the first user input device associated with the first overlapping device functionality. FIG. 3 shows the second user input device with touchscreen inputs in touchscreen display 161 modified to visually correspond to the inputs of first user input device 100, in accordance with some embodiments of the disclosure. For example, the media guidance application may modify the display of an input of the tablet computer device corresponding to the power functionality to resemble visual attributes of a button of the remote control device associated with the power functionality. For example, the media guidance application may modify the display of the input of the tablet computer device by changing the shape of the display of the input to a round shape corresponding to the round shape of the button of the remote control device. The user may more easily recognize and use inputs on the second device that visually resemble inputs on the first device. As a result, the user may have a better experience adapting to the unfamiliar newer device.

In some embodiments, the media guidance application may receive, from a user, a request to modify a display of inputs of a second user input device to correspond to inputs of a first user input device. For example, the user may transmit a request (e.g., via a web interface) to modify the display of inputs of a tablet computer device to correspond to input buttons of a remote control device. In another example, the user may transmit the request via an option on the second user input device. For example, the user may select, from a menu screen on touchscreen display 131 of second user input device 130, as shown in FIG. 2, an action option and external device name, e.g., the device name of first user input device 100, resulting in device 130 generating and transmitting a request to modify the display of inputs of device 130 to correspond to inputs of device 100.

In some embodiments, the media guidance application may receive, from the user, a request to modify a display of inputs of the second user input device, without an indication of a first user input device. For example, the media guidance application may receive, from the user, a request to modify the display of inputs of a tablet computer device. The media guidance application may retrieve a user profile comprising a listing of user input devices associated with the user, where the listing comprises a device identifier and timestamp of usage for each device. The device identifier may be, for example, a hexadecimal code or alphanumeric string that is unique to a device. The timestamp may be, for example, a data structure that stores the year, month, date, hour, minute, and second of a particular point in time. In another example, the timestamp may be represented by a Unix epoch, which is the number of seconds that have elapsed between Jan. 1, 1970 at midnight in Coordinated Universal Time (UTC) and a particular point in time. For example, the media guidance application may retrieve (e.g., from a database), a user profile comprising a list that includes a remote control device with timestamp T1, the tablet computer device with timestamp T2, and a mobile device with timestamp T3, where T1 is earlier than T2 and T2 is earlier than T3. For example, if the timestamp is represented by a Unix epoch, the media guidance application may determine that T1 is earlier than T2 by executing an arithmetic relational comparison and determining that the value of T1 (measured in, for example, seconds) is less than the value of T2. The media guidance application may select, from the listing in the user profile, a first user input device that has a timestamp of usage that is earlier than the timestamp of usage of the second user input device. For example, the media guidance application may select the remote control device with timestamp T1 to be the first user input device. The timestamp for each user input device may represent, for example, the point in time at which the user input device was first registered with the media guidance system, the point in time at which the user input device was first used for more than a threshold amount of time, the point in time at which the user input device was most recently used, or another point in time. By selecting a first user input device that has an earlier timestamp than the second user input device, the media guidance application supplements the user request to modify the display of inputs of the second user input device by selecting a device with more familiar inputs (the first user input device) to model the display of the second user input device after.

In some embodiments, in response to the request from the user to modify a display of inputs of a second user input device, the media guidance application may retrieve a user profile comprising a listing of user input devices associated with the user, where the listing comprises a device identifier and usage amount for each user input device. The usage amount may be, for example, a value of the cumulative amount of time that the user input device has been powered on, measured in seconds, for example. In another example, the usage amount may be the number of times that the user input device has been powered on. In one example, in response to the request from the user to modify the display of inputs of the tablet computer device, the media guidance application may retrieve a user profile comprising a list that includes a remote control device with usage amount A1, the tablet computer device with usage amount A2, and a mobile device with usage amount A3, where A1 is less than A2 and A2 is less than A3. The media guidance application may determine that A1 is less than A2 by executing an arithmetic relational comparison and determining that the value of A1 (measured in, for example, seconds) is less than the value of T2. The media guidance application may select, from the listing, a first user input device that has a usage amount that is greater than the usage amount of the second user input device. For example, the media guidance application may select the mobile device with usage amount A3 to be the first user input device. By selecting a first user input device that has a greater usage amount than the second user input device, the media guidance application supplements the user request to modify the display of inputs of the second user input device by selecting a device with more familiar inputs (the first user input device) to model the display of the second user input device after.

In some embodiments, the media guidance application may retrieve (e.g., from the user profile) a first identifier of the first user input device and a second identifier of the second user input device. For example, the media guidance application may retrieve from a database, as the first identifier, a hexadecimal code associated with the remote control device, and as the second identifier, a hexadecimal code associated with the tablet computer device. In another example, the first identifier and second identifier may be unique alphanumeric strings, memory addresses (e.g., in hexadecimal), hash values, or other representations for which each representation is unique.

The media guidance application may input the first identifier into a first database comprising device functionalities and input maps of the first user input device to determine a first set of device functionalities of the first user input device and a first input map of the first user input device, where the first input map comprises visual attributes of the inputs of the first user input device. For example, the media guidance application may input the first identifier of the remote control device into a first database to retrieve, from the database, a set of device functionalities and a first input map of the remote control device. The first input map may comprise a data structure comprising an identifier, display coordinates, visual attributes, and a corresponding device functionality for each input of the first user input device. For example, the first input map of the remote control device may include, for each input of the remote control device, an input identifier (e.g., a hexadecimal code, alphanumeric string, etc.), visual attributes of the inputs of the remote control device, and a mapping of each input to a corresponding device functionality. In some embodiments, the visual attributes for each input of the first user input device comprise at least one of a shape (e.g., round, rectangular, diamond, etc.), a color scheme (e.g., black text on a grey background), a size (e.g., in pixels, millimeters, etc.), a font face (e.g., serif; sans serif; a specific typeface such as Tahoma; a combination of typeface, size, and weight, etc.), a spatial position (e.g., two-dimensional "x, y" coordinates, coordinate values that are associated with a partition of the device face, etc.), and/or a style identifier (e.g., an identifier associated with various visual attributes, stored in, for example, a data structure mapping identifiers to the various visual attributes). For example, if there are two inputs of the first user input device, one input may have visual attributes including a square shape and a color scheme of red symbols on black background coloring, and the other input may have a visual attribute of a sans serif font face.

The media guidance application may input the second identifier into a second database comprising device functionalities and input maps of the second user input device to determine a second set of device functionalities of the second user input device and a second input map of the second user input device, where the second input map comprises visual attributes of the inputs of the second user input device. For example, the media guidance application may input the second identifier of the tablet computer device into a second database to determine a set of device functionalities and a second input map of the tablet computer device. The second input map may comprise a data structure comprising an identifier, visual attributes, and a corresponding device functionality for each input of the second user input device. For example, the second input map of the tablet computer device may include, for each input of the tablet computer device, an input identifier (e.g., a hexadecimal code, alphanumeric string, etc.), visual attributes of the inputs of the tablet computer device, and a mapping of each input to a corresponding device functionality. In some embodiments, the visual attributes for each input of the second user input device comprise at least one of a shape (e.g., round, rectangular, diamond, etc.), a color scheme (e.g., black text on a grey background), a size (e.g., in pixels, millimeters, etc.), a font face, a spatial position (e.g., serif, sans serif, a specific font face such as Tahoma, etc.), and/or a style identifier (e.g., an identifier associated with various visual attributes, stored in, for example, a data structure mapping identifiers to the various visual attributes). For example, if there are two inputs of the second user input device, one input may have a visual attribute of a round shape, and the other input may have a visual attribute of a size of 30 square pixels.

The media guidance application may compare the first set of device functionalities with the second set of device functionalities and determine, based on the comparing, a set of common device functionalities. For example, the remote control device may have the following first set of device functionalities: power, menu, search, and I/O. On user input device 100, as shown in FIG. 1, for example, input 102 may correspond to a power device functionality, input 104 may correspond to a menu device functionality, input 106 may correspond to a search device functionality, and input 108 may correspond to an I/O (input/output) device functionality. The tablet computer device may have the following second set of device functionalities: power, menu, search, I/O, Netflix, and Fire TV. On touchscreen user input device 130, as shown in FIG. 2, for example, input 132 may correspond to a power device functionality, input 134 may correspond to a menu device functionality, input 136 may correspond to a search device functionality, input 138 may correspond to an I/O device functionality, and inputs 141 may correspond to Netflix, Fire TV, and other device functionalities. In this example, the media guidance application may compare the first set of device functionalities with the second set of device functionalities and determine the set of common device functionalities to be power, menu, search, and I/O. By determining which device functionalities are common to both the newer and the older user input devices, the media guidance application may determine which corresponding inputs of the second (newer) user input device can be modified to visually resemble inputs of the first (older) user input device. In this example, by determining the set of common device functionalities to be power, menu, search, and I/O, the media guidance application may determine that input 132 may be modified to visually resemble input 102, as inputs 102 and 132 correspond to the power device functionality; that input 134 may be modified to visually resemble input 104, as inputs 104 and 134 correspond to the menu device functionality; that input 136 may be modified to visually resemble input 106, as inputs 106 and 136 correspond to the search device functionality; and that input 138 may be modified to visually resemble input 108, as inputs 108 and 138 correspond to the input (I/O) device functionality.

In some embodiments, the media guidance application may compare the first set of device functionalities with the second set of device functionalities by comparing a first device functionality from the first set with a second device functionality from the second set and determining whether, at a given state for a given user equipment device, executing the first device functionality would result in a same output state of the given user equipment device as executing the second device functionality. For example, the media guidance application may compare the power device functionality from the first set of device functionalities with the power device functionality from the second set of device functionalities and determine whether, at a given state for a given user equipment device (e.g., a set-top box), executing the first power device functionality would result in a same output state of the given user equipment device as executing the second power device functionality. For example, the media guidance application may determine whether, at an "on" state of a set-top box associated with the remote control device and tablet computer device, executing the first power device functionality of the remote control device would result in the same state (e.g., an "off" state) as executing the second power device functionality of the tablet computer device. In another example, the media guidance application may compare the first device functionality with the second device functionality by determining whether, at a first given state of a first user equipment device that is associated with the first user input device, executing the first device functionality would result in a similar output state as would, at a second given state of a second user equipment device that is associated with the second user input device, executing the second device functionality. The media guidance application may determine whether two output states are similar by comparing, for example, playback status, display settings, etc. of the output states, and, for example, determining whether a threshold number of settings match. The media guidance application may make this determination for each possible pairing of inputs from the first user input device and the second user input device.

In some embodiments, in response to determining that, at a given state for a given user equipment device, executing the first device functionality would result in the same output state as executing the second device functionality, the media guidance application may add the first device functionality to the set of common device functionalities. For example, in response to determining that, at an "on" state of a set-top box, executing the first power device functionality of the remote control device would result in a same "off" state as executing the second power device functionality of the tablet computer device, the media guidance application may add the power device functionality to a set of common device functionalities between the remote control device and the tablet computer device. The set of common device functionalities may be stored in, for example, a data structure comprising a list of each common device functionality, which may be represented by a unique identifier (e.g., a hexadecimal code, alphanumeric string, a descriptive string, etc.).

In response to determining the set of common device functionalities, the media guidance application may retrieve a first input of the first user input device that corresponds to a first device functionality in the set of common device functionalities and a second input of the second user input device that corresponds to the first device functionality in the set of common device functionalities. For example, the media guidance application may retrieve first input 102 of user input device 100 (e.g., a remote control device) (FIG. 1) that corresponds to the first power device functionality and second input 132 of user input device 130 (e.g., a tablet computer device) (FIG. 2) that corresponds to the first power device functionality.

In some embodiments, the media guidance application may retrieve a first input of the first user input device that corresponds to a first device functionality in the set of common device functionalities and a second input of the second user input device that corresponds to a second device functionality in the set of common device functionalities. For example, the media guidance application may retrieve first input 102 of the remote control device that corresponds to a power device functionality and, for example, second input 136 of the tablet computer device that corresponds to a question device functionality. In this example, first input 102 and second input 136 do not correspond to a common device functionality, but it may still be advantageous to modify the visual attributes of second input 136 to resemble first input 102, for example, if the device functionalities of the inputs are related but not the same.

The media guidance application may modify visual attributes of the second input of the second user input device to correspond to visual attributes of the first input of the first user input device. This may result in the display of inputs of the second user input device to be modified as shown in FIG. 3. Modifying visual attributes may include, for example, changing a size, shape, color scheme, font, position, etc. of the input. For example, the media guidance application may modify the shape, font face, and position of input 132 of device 130 (FIG. 2) to correspond to the shape, font face, and position of input 102 of device 100 (FIG. 1), resulting in modified input 162 of device 160 (FIG. 3), which has the same rectangular shape, capital-letter font face, and upper-left corner position as input 102. Similarly, modifying input 134, 136, and 138 to correspond to inputs 104, 106, and 108, respectively, may result in modified inputs 164, 166, and 168, respectively. In some examples, some visual attributes of the second input may be modified to correspond to the visual attributes of the first input while some visual attributes of the second input may not be modified. For example, inputs 110 (FIG. 1) and 140 (FIG. 2) may correspond to the same device functionality, and input 140 may be modified to visually correspond to input 110 by changing the color scheme and shape of input 140 to match input 110 but leaving the position of input 140 unmodified, as shown by modified input 170 (FIG. 3). In another example, where the first and second input do not correspond to a common device functionality, the media guidance application may modify the color scheme of input 136 (FIG. 2), for example, to correspond to the color scheme of input 102 (FIG. 1), for example. In some cases, when the first user input device has a display surface that differs from the display surface of the second user input device (e.g., as shown in FIGS. 1 and 2, where the input display surface of device 100 is a trapezoidal shape that may have, for example, a slightly convex surface, and the input display surface of device 130 is rectangular and flat), modifying the visual attributes of the second input may include skewing the second input, in shape, size, position, or another way, to resemble the first input. By modifying visual attributes of the second input to correspond to visual attributes of the first input, the second input is presented in a more familiar way to the user, who may not have recognized the device functionality of the second input with unfamiliar visual attributes. In some other cases, the media guidance application may refrain from modifying visual attributes of a second input to correspond to visual attributes of a first input that has a common device functionality with the second input. For example, inputs 112 and 113 (FIG. 1) may each have a corresponding common device functionality with inputs 142 and 143 (FIG. 2), respectively, and the media guidance application may refrain from modifying visual attributes of 142 and 143, as shown by unmodified inputs 172 and 173 (FIG. 3). Similarly, inputs 120 (FIG. 1) and inputs 145 (FIG. 2) may have corresponding common device functionalities and the media guidance application may refrain from modifying visual attributes of inputs 145, as shown by unmodified inputs 175 (FIG. 3). This may, for example, result in device 160 with modified display 161 (FIG. 3) presenting a more transitional interface to the user, where certain inputs are familiar and certain inputs may be unfamiliar.

In some embodiments, the media guidance application may determine an exclusive set of device functionalities that are in the second set of device functionalities and not in the first set of device functionalities. For example, if the first set of device functionalities includes power, menu, search, and I/O, and the second set of device functionalities includes power, menu, search, I/O, Netflix, Fire TV, HBO, Hulu, YouTube, and keyboard, the media guidance application may determine the exclusive set of device functionalities that are in the second set and not the first set to include the Netflix, Fire TV, HBO, Hulu, YouTube, and keyboard device functionalities. For example, the media guidance application may determine the corresponding inputs of the exclusive set of device functionalities to include inputs 141 (corresponding to the Netflix, Fire TV, HBO, Hulu, and YouTube device functionalities) and inputs 150 (corresponding to the keyboard device functionality) of device 130 (FIG. 2).

The media guidance application may retrieve a third input of the second user input device that corresponds to a third device functionality in the exclusive set of device functionalities. For example, the media guidance application may retrieve a third input of inputs 141 of the tablet computer device that corresponds, for example, to a Netflix device functionality.

The media guidance application may modify visual attributes of the third input of the second user input device to correspond to visual attributes of the first input of the first user input device. For example, the media guidance application may modify the size and color scheme of the third input to correspond to the size and color scheme of, for example, input 104 of device 100. By modifying the visual attributes of inputs of the second user input device that correspond to the set of exclusive device functionalities, the media guidance application may present the user with a more familiar interface for a new device functionality, which both improves accessibility of the new user input device and preserves the additional functionality of the new user input device, thereby improving user experience. In another example, the media guidance application may refrain from modifying visual attributes of the third input of the second user input device to correspond to a first input of the first user input device. For example, the media guidance application may refrain from modifying inputs 141 and inputs 150 (FIG. 2), which correspond to the exclusive set of device functionalities, resulting in unmodified inputs 171 and inputs 180 (FIG. 3).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
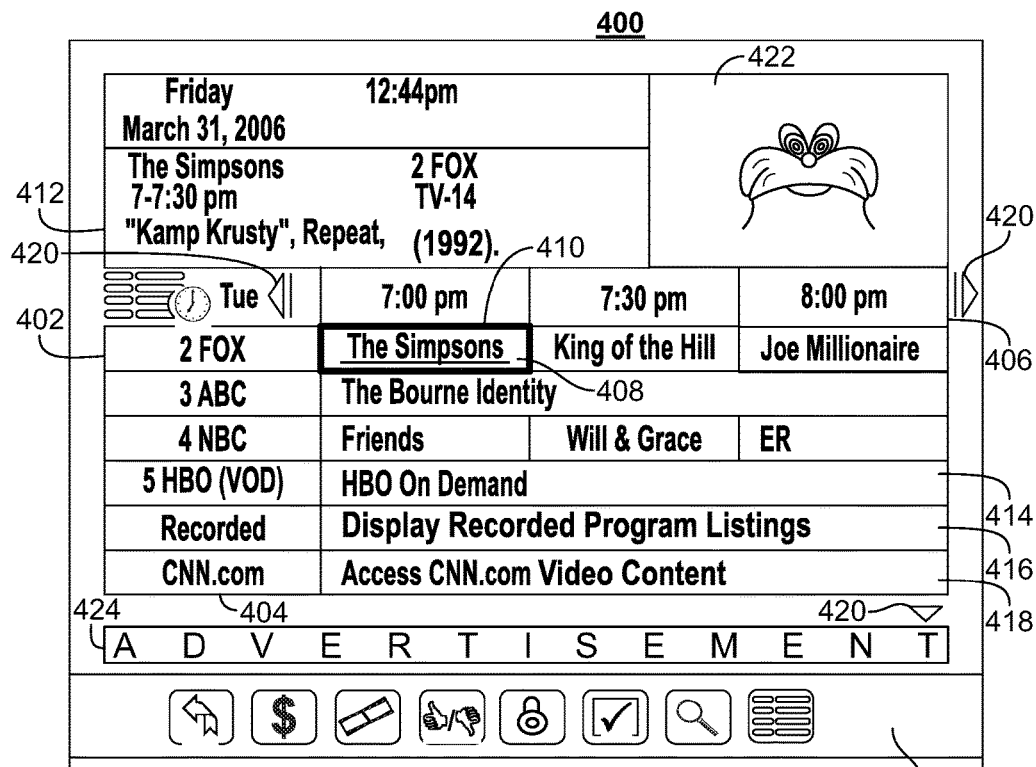
FIGS. 4 and 5 show illustrative examples of display screens generated by a media guidance application in accordance with some embodiments of the disclosure.
Figure 5:
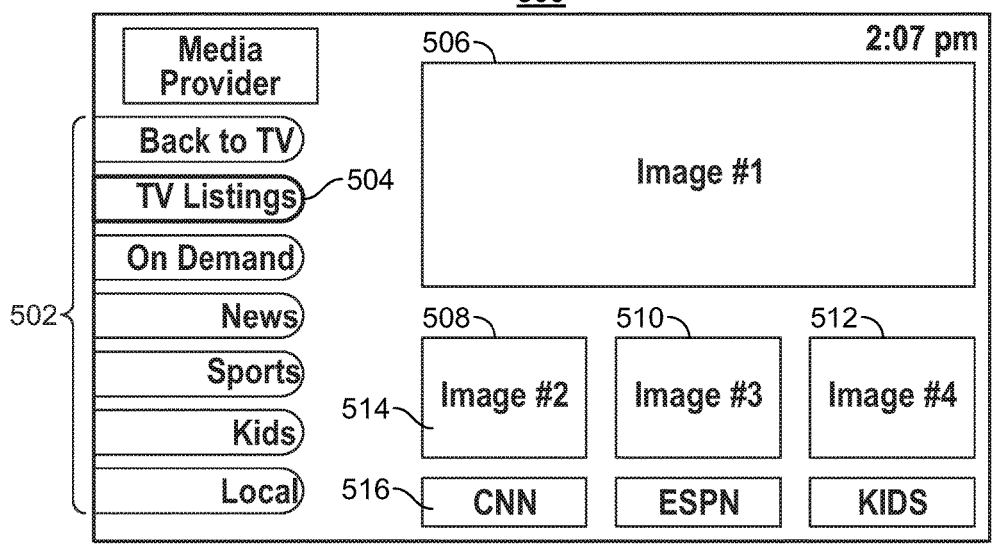

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
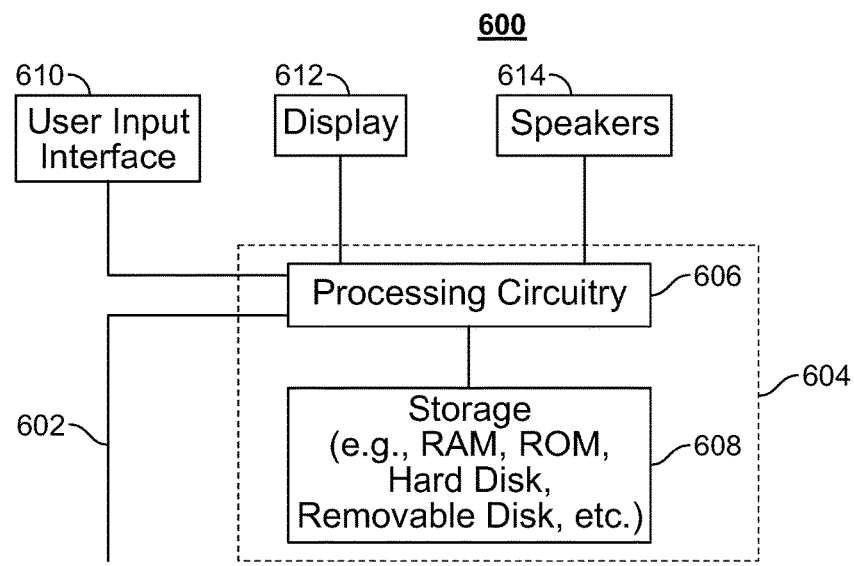
FIG. 6 is a block diagram of an illustrative user equipment device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
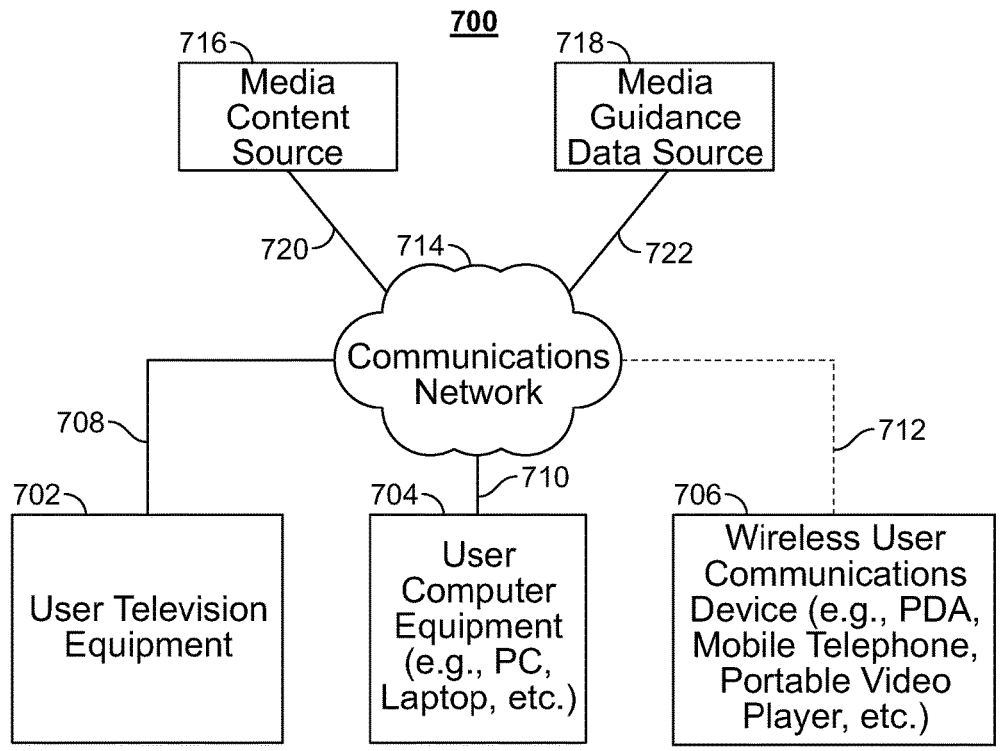
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
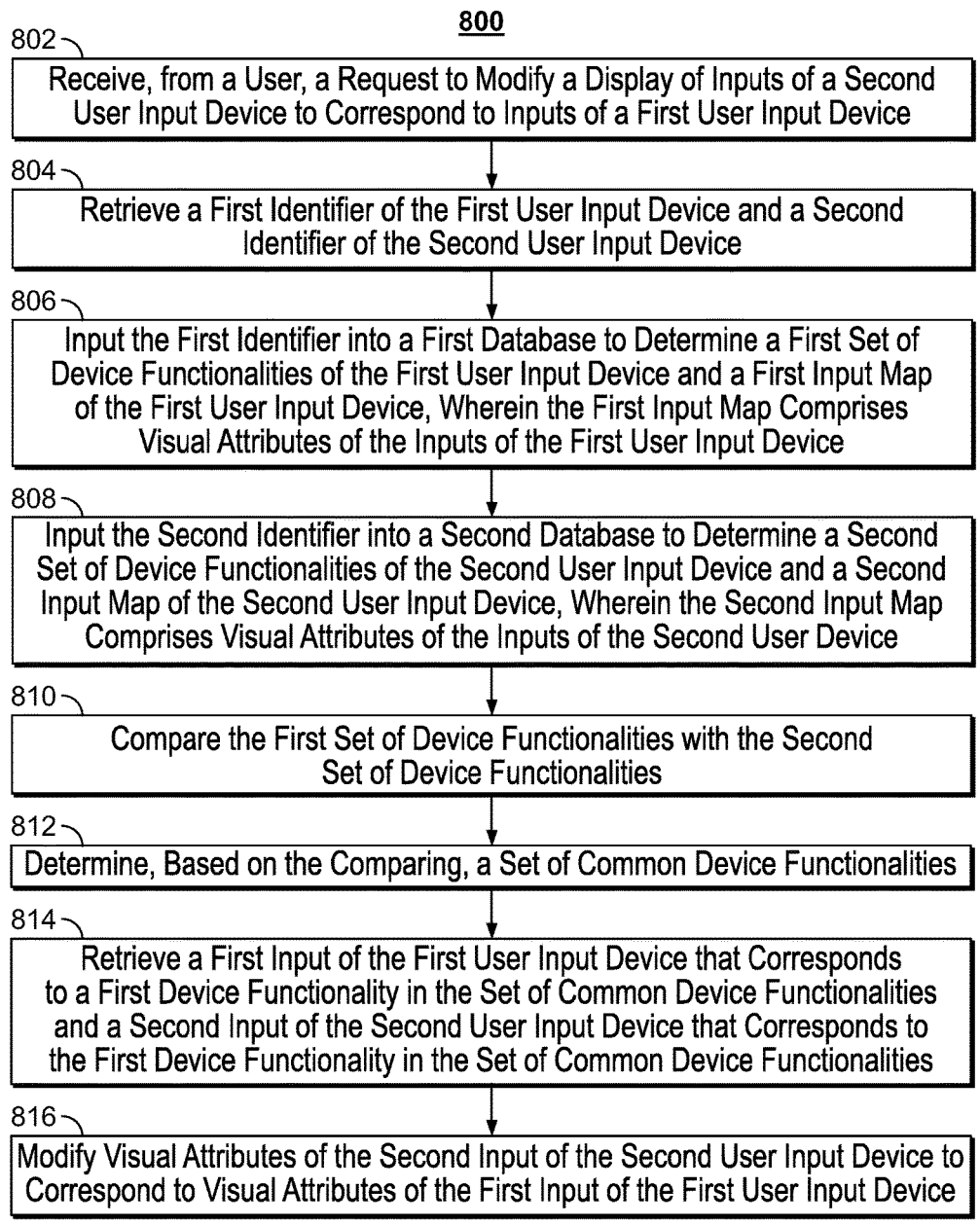
FIG. 8 is a flowchart of a detailed illustrative process for modifying visual attributes of a second input of a second user input device to correspond to visual attributes of a first input of a first user input device, in accordance with some embodiments of the disclosure.

FIG. 8 is a flowchart of a detailed illustrative process for modifying visual attributes of a second input of a second user input device to correspond to visual attributes of a first input of a first user input device, in accordance with some embodiments of the disclosure. It should be noted that process 800 or any step thereof could be performed on, or provided by, any of the devices shown in FIGS. 6-7. For example, process 800 may be executed by control circuitry 604 (FIG. 6) as instructed by a media guidance application implemented on a user device (e.g., user equipment devices 702, 704, and/or 706 (FIG. 7)) in order to modify visual attributes of an input of a user input device. In addition, one or more steps of process 800 may be incorporated into or combined with one or more steps of any other process or embodiment described herein.

At 802, the media guidance application (e.g., via control circuitry 604) receives a request, from a user, to modify a display of inputs of a second user input device to correspond to inputs of a first user input device. For example, the media guidance application may receive, e.g., via communications network 714, a request from the user to modify the display of inputs of a tablet computer device to correspond to input buttons of a remote control device.

At 804, the media guidance application (e.g., via control circuitry 604) retrieves a first identifier of the first user input device and a second identifier of the second user input device. For example, the media guidance application may retrieve, e.g., from storage 608 or media guidance data source 718, a first hexadecimal code identifying the first user input device as the first identifier and a second hexadecimal code identifying the second user input device as the second identifier.

At 806, the media guidance application (e.g., via control circuitry 604) inputs the first identifier into a first database to determine a first set of device functionalities of the first user input device and a first input map of the first user input device, wherein the first input map comprises visual attributes of the inputs of the first user input device. For example, the media guidance application may input the first identifier of the remote control device into a first database to determine a set of device functionalities and a first input map of the remote control device. As described above, the first input map may comprise a data structure comprising an identifier, display coordinates, visual attributes, and a corresponding device functionality for each input of the first user input device. For example, the first input map of the remote control device may include a device identifier such as the first identifier, display coordinates representing the spatial positioning of inputs of the remote control device, visual attributes of the inputs of the remote control device, and a mapping of each input to a corresponding device functionality.

At 808, the media guidance application (e.g., via control circuitry 604) inputs the second identifier into a second database to determine a second set of device functionalities of the second user input device and a second input map of the second user input device, wherein the second input map comprises visual attributes of the inputs of the second user device. For example, the media guidance application may input the second identifier of the tablet computer device into a second database to determine a set of device functionalities and a second input map of the tablet computer device. As described above, the second input may comprise a data structure comprising an identifier, display coordinates, visual attributes, and a corresponding device functionality for each input of the second user input device. For example, the second input map of the tablet computer device may include a device identifier such as the second identifier, display coordinates representing the spatial positioning of inputs of the tablet computer device, visual attributes of the inputs of the tablet computer device, and a mapping of each input to a corresponding device functionality.

At 810, the media guidance application (e.g., via control circuitry 604) compares the first set of device functionalities with the second set of device functionalities. For example, the media guidance application may compare the set of device functionalities of the remote control device—power, play, pause, and stop—with the set of device functionalities of the tablet computer device—power, play, pause, stop, rewind, and fast-forward.

At 812, the media guidance application (e.g., via control circuitry 604) determines a set of common device functionalities, based on the comparing. For example, the media guidance device may determine, based on comparing the set of device functionalities of the remote control device with the set of device functionalities of the tablet computer device, a set of common device functionalities including power, play, pause, and stop.

At 814, the media guidance application (e.g., via control circuitry 604) retrieves a first input of the first user input device that corresponds to a first device functionality in the set of common device functionalities and a second input of the second user input device that corresponds to the first device functionality in the set of common device functionalities. For example, the media guidance application may retrieve a first input of the remote control device that corresponds to the first power device functionality and a second input of the tablet computer device that corresponds to the first power device functionality.

At 816, the media guidance application (e.g., via control circuitry 604) modifies visual attributes of the second input of the second user input device to correspond to visual attributes of the first input of the first user input device. For example, the media guidance application may modify the shape and font face of the input corresponding to the first power device functionality of the tablet computer device to correspond to the shape and font face of the input corresponding to the first power device functionality of the remote control device.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 8.

Figure 9:
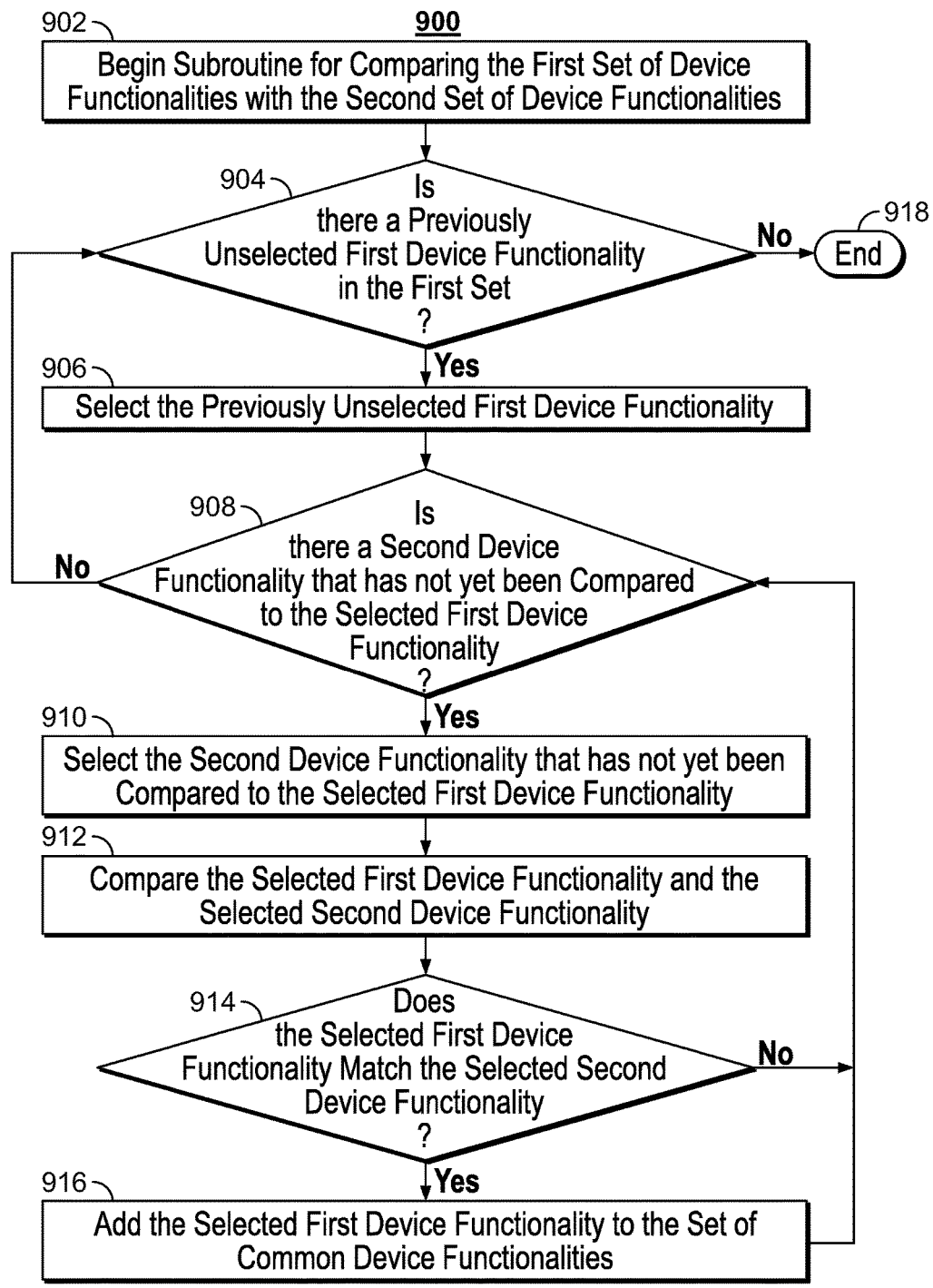
FIG. 9 is a flowchart of a detailed illustrative process for comparing the first set of device functionalities with the second set of device functionalities, in accordance with some embodiments of the disclosure.

FIG. 9 is a flowchart of a detailed illustrative process for comparing the first set of device functionalities with the second set of device functionalities, in accordance with some embodiments of the disclosure. It should be noted that process 900 or any step thereof could be performed on, or provided by, any of the devices shown in FIGS. 6-7. For example, process 900 may be executed by control circuitry 604 (FIG. 4) as instructed by a media guidance application implemented on a user device (e.g., user equipment devices 702, 704, and/or 706 (FIG. 7)) in order to compare the sets of device functionalities. In addition, one or more steps of process 900 may be incorporated into or combined with one or more steps of any other process or embodiment described herein.

At 902, the media guidance application (e.g., via control circuitry 604) begins a subroutine for comparing the first set of device functionalities with the second set of device functionalities.

At 904, the media guidance application (e.g., via control circuitry 604) makes a determination as to whether there is a previously unselected first device functionality in the first set. For example, the media guidance data system may use an iterator to iterate through each first device functionality, thereby selecting each first device functionality exactly once. The media guidance application may determine that there is a previously unselected first device functionality in the first set if the iterator is pointing to a valid first device functionality and not, for example, a null pointer. In response to determining that there is a previously unselected first device functionality in the first set, process 900 proceeds to 906. Otherwise, process 900 proceeds to 918.

At 906, the media guidance application (e.g., via control circuitry 604) selects the previously unselected first device functionality. For example, the media guidance application may select a first play device functionality as the previously unselected first device functionality.

At 908, the media guidance application (e.g., via control circuitry 604) makes a determination as to whether there is a second device functionality that has not yet been compared to the selected first device functionality. For example, the media guidance system may use a second iterator to iterate through each second device functionality for each first device functionality selection, thereby selecting each second device functionality exactly once for each first device functionality selection. In response to determining that there is a second device functionality that has not yet been compared to the selected first device functionality, process 900 proceeds to 910. Otherwise, process 900 proceeds to 904.

At 910, in response to determining that there is a second device functionality that has not yet been compared to the selected first device functionality, the media guidance application (e.g., via control circuitry 604) selects the second device functionality that has not yet been compared to the selected first device functionality. For example, the media guidance application may, in response to determining that a second play device functionality has not yet been compared to the first play device functionality, select the second play device functionality.

At 912, the media guidance application (e.g., via control circuitry 604) compares the selected first device functionality and the selected second device functionality. For example, the media guidance application may compare the first play device functionality with the second play device functionality.

At 914, the media guidance application (e.g., via control circuitry 604) makes a determination as to whether the selected first device functionality matches the selected second device functionality. For example, the media guidance application may determine whether, for a given user device (e.g., user computer equipment 704 or wireless user communications device 706) at a given state (e.g., a "paused" state), where the given user device is associated with both the first and second user input devices (e.g., the remote control device and the tablet computer device), executing the first play device functionality (e.g., of the remote control device) would result in the same output state (e.g., a "playback" state) as executing the second play device functionality (e.g., of the tablet computer device) would. In response to determining that the selected first device functionality matches the selected second device functionality, process 900 proceeds to 916. Otherwise, process 900 proceeds to 908.

At 916, the media guidance application (e.g., via control circuitry 604) adds the selected first device functionality to the set of common device functionalities. For example, in response to determining that the first play device functionality matches the second play device functionality, the first play device functionality is added to the set of common device functionalities. In another example, a unique identifier that represents both the selected first device functionality and the selected second device functionality may be added to the set of common device functionalities. For example, if the first device functionality of the first user input device is a "jump" command and the second device functionality of the second user input device is a "back" command, and the media guidance application determines via comparing the device functionalities that the first device functionality matches the second device functionality, the media guidance application may add a unique identifier that matches both the "jump" command of the first user input device and the "back" command of the second user input device to the set of common device functionalities. The unique identifier may be, for example, an alphanumeric string that is associated with the transition from a first device state (i.e., of the user equipment device associated with the user input device) to a second device state.

At 918, process 900 ends.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 9.

Figure 10:
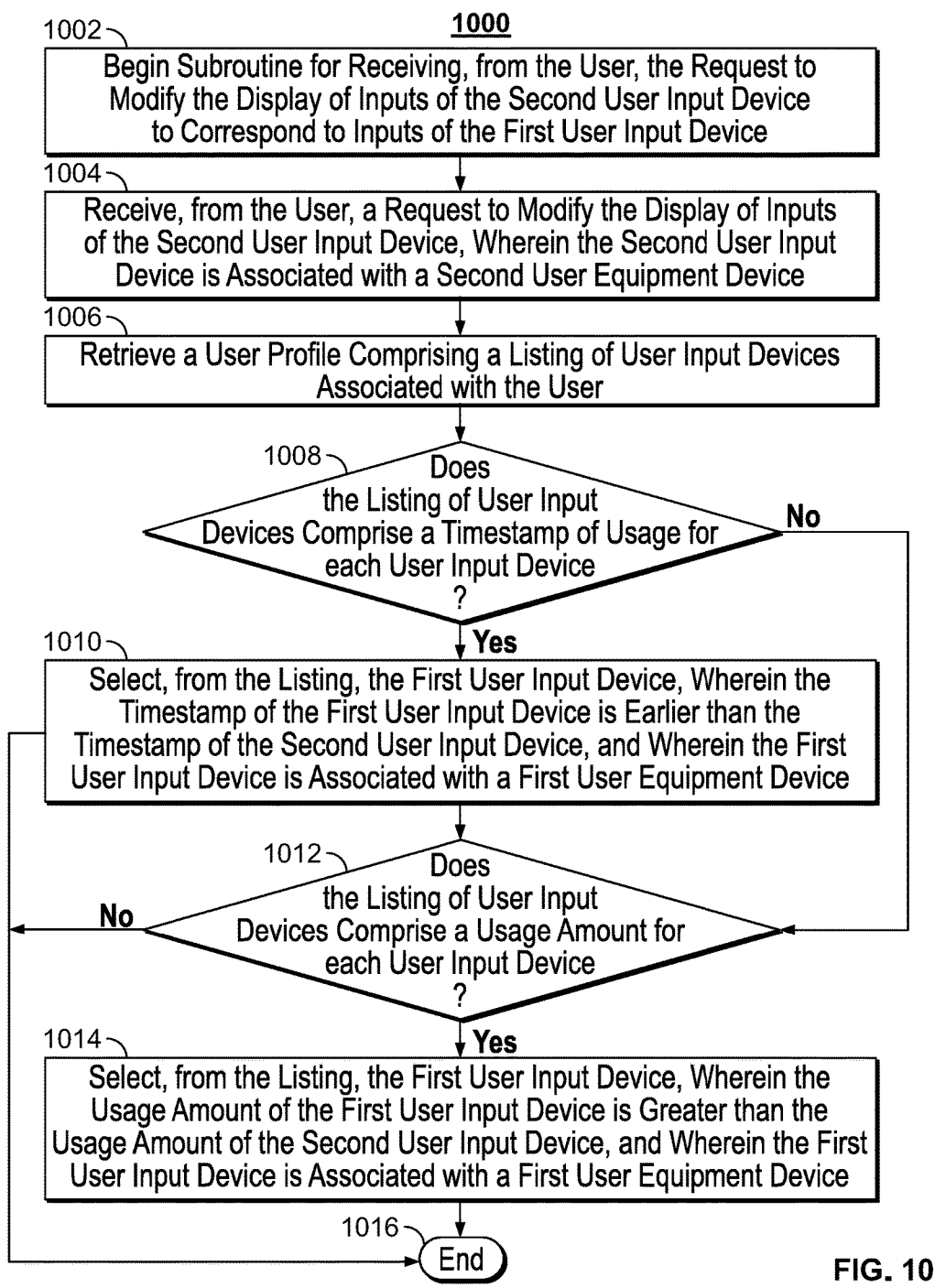
FIG. 10 is a flowchart of a detailed illustrative process for receiving, from the user, the request to modify the display of inputs of the second user input device to correspond to inputs of the first user input device, in accordance with some embodiments of the disclosure.

FIG. 10 is a flowchart of a detailed illustrative process for receiving, from the user, the request to modify the display of inputs of the second user input device to correspond to inputs of the first user input device, in accordance with some embodiments of the disclosure. It should be noted that process 1000 or any step thereof could be performed on, or provided by, any of the devices shown in FIGS. 6-7. For example, process 1000 may be executed by control circuitry 604 (FIG. 6) as instructed by a media guidance application implemented on a user device (e.g., user equipment devices 702, 704, and/or 706 (FIG. 7)) in order to receive the user request. In addition, one or more steps of process 1000 may be incorporated into or combined with one or more steps of any other process or embodiment described herein.

At 1002, the media guidance application (e.g., via control circuitry 604) begins a subroutine for receiving, from the user, the request to modify the display of inputs of the second user input device to correspond to inputs of the first user input device.

At 1004, the media guidance application (e.g., via control circuitry 604) receives a request, from the user, to modify the display of inputs of the second user input device, wherein the second user input device is associated with a second user equipment device. For example, the media guidance application may receive a request (e.g., via communications network 514) from the user to modify the display of inputs of a tablet computer device to correspond to input buttons of a remote control device.

At 1006, the media guidance application (e.g., via control circuitry 604) retrieves a user profile comprising a listing of user input devices associated with the user. For example, the media guidance application may retrieve a user profile comprising a listing of user input devices associated with the user. For example, the user profile may list a remote control device with associated timestamp T1 and usage amount U1, a tablet computer device with timestamp T2 and usage amount U2, and a mobile device with timestamp T3 and usage amount U3, where T1 is earlier than T2 and T2 is earlier than T3, and U1 is greater than U2 and U2 is greater than U3.

At 1008, the media guidance application (e.g., via control circuitry 604) makes a determination as to whether the listing of user input devices comprises a timestamp of usage for each user input device. For example, the listing of user input devices may comprise a data structure that has a field for each user input device and a corresponding field for a timestamp of usage for the user input device. The media guidance application may iterate through and check the value of each timestamp field for each user input device and, if all timestamp fields are non-empty or not null, the media guidance application may determine that the listing of user input devices comprises a timestamp of usage for each user input device. If it is determined that the listing of user input devices comprises a timestamp of usage for each user input device, process 1000 proceeds to 1010. Otherwise, process 1000 proceeds to 1012.

At 1010, the media guidance application (e.g., via control circuitry 604) selects the first user input device from the listing, wherein the timestamp of the first user input device is earlier than the timestamp of the second user input device, and wherein the first user input device is associated with a first user equipment device. For example, if the second user input device is the tablet computer device (with corresponding timestamp T2), the media guidance application may select the remote control device with corresponding timestamp T1, where T1 is earlier than T2, as the first user input device.

At 1012, the media guidance application (e.g., via control circuitry 604) makes a determination as to whether the listing of user input devices comprises a usage amount for each user input device. For example, the listing of user input devices may comprise a data structure that has a field for each user input device and a corresponding field for a usage amount for the user input device. The media guidance application may iterate through and check the value of each usage amount field for each user input device and, if all usage amount fields are non-empty or not null, the media guidance application may determine that the listing of user input devices comprises a usage amount for each user input device. In response to determining that the listing of user input devices comprises a usage amount for each user input device, process 1000 proceeds to 1014. Otherwise, process 1000 proceeds to 1016.

At 1014, the media guidance application (e.g., via control circuitry 604) selects the first user input device from the listing, wherein the usage amount of the first user input device is greater than the usage amount of the second user input device, and wherein the first user input device is associated with a first user equipment device. For example, if the second user input device is the tablet computer device (with corresponding usage amount U2), the media guidance application may select the mobile device with corresponding usage amount U1, where U1 is greater than U2, as the first user input device.

At 1016, process 1000 ends.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 10.

Figure 11:
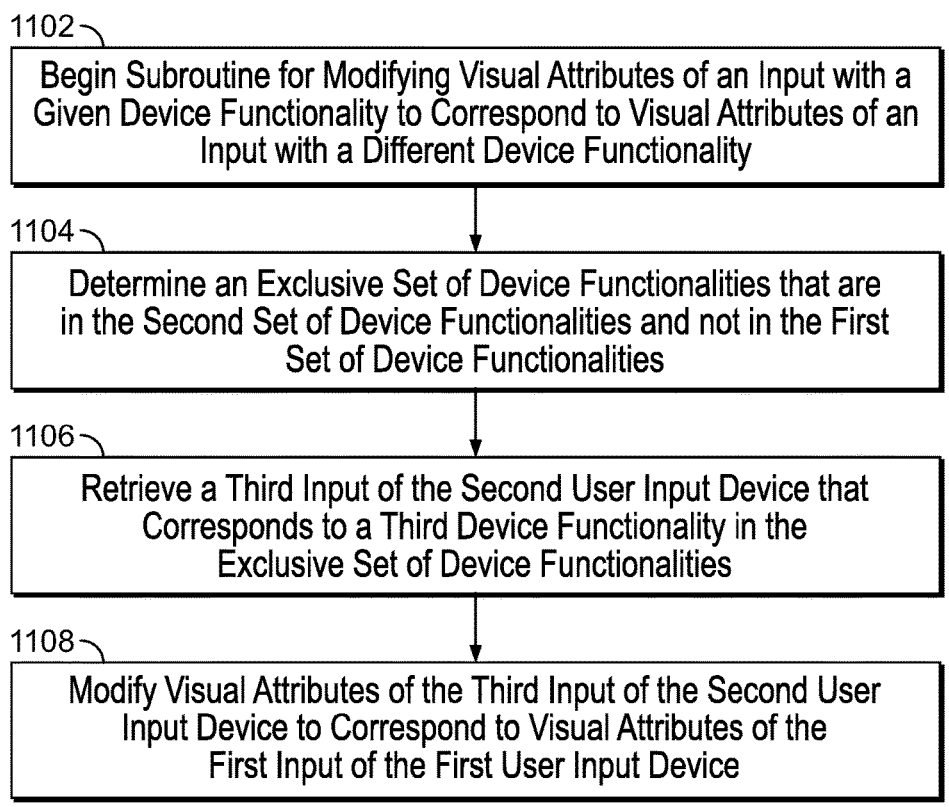
FIG. 11 is a flowchart of a detailed illustrative process for modifying visual attributes of an input with a given device functionality to correspond to visual attributes of an input with a different device functionality, in accordance with some embodiments of the disclosure.

FIG. 11 is a flowchart of a detailed illustrative process for modifying visual attributes of an input with a given device functionality to correspond to visual attributes of an input with a different device functionality, in accordance with some embodiments of the disclosure. It should be noted that process 1100 or any step thereof could be performed on, or provided by, any of the devices shown in FIGS. 6-7. For example, process 1100 may be executed by control circuitry 604 (FIG. 6) as instructed by a media guidance application implemented on a user device (e.g., user equipment devices 702, 704, and/or 706 (FIG. 7)) in order to modify visual attributes of an input. In addition, one or more steps of process 1100 may be incorporated into or combined with one or more steps of any other process or embodiment described herein.

At 1102, the media guidance application (e.g., via control circuitry 604) begins a subroutine for modifying visual attributes of an input with a given device functionality to correspond to visual attributes of an input with a different device functionality.

At 1104, the media guidance application (e.g., via control circuitry 604) determines an exclusive set of device functionalities that are in the second set of device functionalities and not in the first set of device functionalities. For example, if the first set of device functionalities includes power, play, pause, and stop, and the second set of device functionalities includes power, play, pause, stop, rewind, and fast-forward, the media guidance application may determine the exclusive set of device functionalities that are in the second set and not the first set to include the rewind and fast-forward device functionalities.

At 1106, the media guidance application (e.g., via control circuitry 604) retrieves a third input of the second user input device that corresponds to a third device functionality in the exclusive set of device functionalities. For example, the media guidance application may retrieve, from the exclusive set of device functionalities (e.g., from storage 408), a third input of the tablet computer device that corresponds to the rewind device functionality.

At 1108, the media guidance application (e.g., via control circuitry 604) modifies visual attributes of the third input of the second user input device to correspond to visual attributes of the first input of the first user input device. For example, the media guidance application may modify the size and color scheme of the input of the tablet computer device that corresponds to the rewind device functionality to correspond to the size and color scheme of the input of the remote control device that corresponds to, for example, a play device functionality.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 11.

What is claimed is:

1. A method for adapting a touchscreen user input device to resemble a previous user input device while preserving new functionalities not available in the previous user input device, the method comprising:

receiving, from a user, a request to modify a display of inputs of a second user input device to correspond to inputs of a first user input device;

retrieving a first identifier of the first user input device and a second identifier of the second user input device;

inputting the first identifier into a first database comprising device functionalities and input maps of the first user input device to determine a first set of device functionalities of the first user input device and a first input map of the first user input device, wherein the first input map comprises visual attributes of the inputs of the first user input device;

inputting the second identifier into a second database comprising device functionalities and input maps of the second user input device to determine a second set of device functionalities of the second user input device and a second input map of the second user input device, wherein the second input map comprises visual attributes of the inputs of the second user device;

comparing the first set of device functionalities with the second set of device functionalities;

determining, based on the comparing, a set of common device functionalities;

in response to determining the set of common device functionalities, retrieving a first input of the first user input device that corresponds to a first device functionality in the set of common device functionalities and a second input of the second user input device that corresponds to the first device functionality in the set of common device functionalities; and modifying visual attributes of the second input of the second user input device to correspond to visual attributes of the first input of the first user input device.

2. The method of claim 1, wherein the first input map comprises a data structure comprising an identifier, visual attributes, and a corresponding device functionality for each input of the first user input device, and wherein the second input map comprises a data structure comprising an identifier, visual attributes, and a corresponding device functionality for each input of the second user input device.

3. The method of claim 2, wherein the visual attributes for each input of the first and second user input devices comprise at least one of a shape, a color scheme, a size, a font face, a spatial position, and/or a style identifier.

4. The method of claim 1, wherein comparing the first set of device functionalities with the second set of device functionalities comprises comparing a first device functionality from the first set with a second device functionality from the second set and determining whether, at a given state for a given user equipment device, executing the first device functionality would result in a same output state of the given user equipment device as executing the second device functionality.

5. The method of claim 4, further comprising, in response to determining that, at a given state for a given user equipment device, executing the first device functionality would result in the same output state as executing the second device functionality, adding the first device functionality to the set of common device functionalities.

6. The method of claim 1, wherein receiving, from the user, the request to modify the display of inputs of the second user input device to correspond to inputs of the first user input device comprises:
receiving, from the user, a request to modify the display of inputs of the second user input device;
retrieving a user profile comprising a listing of user input devices associated with the user, wherein the listing comprises a device identifier and timestamp of usage for each user input device; and
selecting, from the listing, the first user input device, wherein the timestamp of the first user input device is earlier than the timestamp of the second user input device.

7. The method of claim 1, wherein receiving, from the user, the request to modify the display of inputs of the second user input device to correspond to inputs of the first user input device comprises:
receiving, from the user, a request to modify the display of inputs of the second user input device;
retrieving a user profile comprising a listing of user input devices associated with the user, wherein the listing comprises a device identifier and usage amount for each user input device; and
selecting, from the listing, the first user input device, wherein the usage amount of the first user input device is greater than the usage amount of the second user input device.

8. The method of claim 1, wherein retrieving a first input of the first user input device that corresponds to a first device functionality in the set of common device functionalities and a second input of the second user input device that corresponds to the first device functionality in the set of common device functionalities comprises:
retrieving a first input of the first user input device that corresponds to a first device functionality in the set of common device functionalities and a second input of the second user input device that corresponds to a second device functionality in the set of common device functionalities.

9. The method of claim 1, further comprising:
determining an exclusive set of device functionalities that are in the second set of device functionalities and not in the first set of device functionalities;
retrieving a third input of the second user input device that corresponds to a third device functionality in the exclusive set of device functionalities; and
modifying visual attributes of the third input of the second user input device to correspond to visual attributes of the first input of the first user input device.

10. The method of claim 1, wherein the first user input device is associated with a first user equipment device, and the second user input device is associated with a second user equipment device.

11. A system for adapting a touchscreen user input device to resemble a previous user input device while preserving new functionalities not available in the previous user input device, the system comprising:
communications circuitry; and
control circuitry configured to:
receive, from a user, a request to modify a display of inputs of a second user input device to correspond to inputs of a first user input device;
retrieve a first identifier of the first user input device and a second identifier of the second user input device;
input the first identifier into a first database comprising device functionalities and input maps of the first user input device to determine a first set of device functionalities of the first user input device and a first input map of the first user input device, wherein the first input map comprises visual attributes of the inputs of the first user input device;
input the second identifier into a second database comprising device functionalities and input maps of the second user input device to determine a second set of device functionalities of the second user input device and a second input map of the second user input device, wherein the second input map comprises visual attributes of the inputs of the second user device;
compare the first set of device functionalities with the second set of device functionalities;

determine, based on the comparing, a set of common device functionalities;

in response to determining the set of common device functionalities, retrieve a first input of the first user input device that corresponds to a first device functionality in the set of common device functionalities and a second input of the second user input device that corresponds to the first device functionality in the set of common device functionalities; and modify visual attributes of the second input of the second user input device to correspond to visual attributes of the first input of the first user input device.

12. The system of claim 11, wherein the first input map comprises a data structure comprising an identifier, visual attributes, and a corresponding device functionality for each input of the first user input device, and wherein the second input map comprises a data structure comprising an identifier, visual attributes, and a corresponding device functionality for each input of the second user input device.

13. The system of claim 12, wherein the visual attributes for each input of the first and second user input devices comprise at least one of a shape, a color scheme, a size, a font face, a spatial position, and/or a style identifier.

14. The system of claim 11, wherein the control circuitry is further configured, when comparing the first set of device functionalities with the second set of device functionalities, to compare a first device functionality from the first set with a second device functionality from the second set and determine whether, at a given state for a given user equipment device, executing the first device functionality would result in a same output state of the given user equipment device as executing the second device functionality.

15. The system of claim 14, wherein the control circuitry is further configured to, in response to determining that, at a given state for a given user equipment device, executing the first device functionality would result in the same output state as executing the second device functionality, add the first device functionality to the set of common device functionalities.

16. The system of claim 11, wherein the control circuitry is further configured, when receiving, from the user, the request to modify the display of inputs of the second user input device to correspond to inputs of the first user input device, to:

receive, from the user, a request to modify the display of inputs of the second user input device;

retrieve a user profile comprising a listing of user input devices associated with the user, wherein the listing comprises a device identifier and timestamp of usage for each user input device; and select, from the listing, the first user input device, wherein the timestamp of the first user input device is earlier than the timestamp of the second user input device.

17. The system of claim 11, wherein the control circuitry is further configured, when receiving, from the user, the request to modify the display of inputs of the second user input device to correspond to inputs of the first user input device, to:

receive, from the user, a request to modify the display of inputs of the second user input device;

retrieve a user profile comprising a listing of user input devices associated with the user, wherein the listing comprises a device identifier and usage amount for each user input device; and select, from the listing, the first user input device, wherein the usage amount of the first user input device is greater than the usage amount of the second user input device.

18. The system of claim 11, wherein the control circuitry is further configured, when retrieving a first input of the first user input device that corresponds to a first device functionality in the set of common device functionalities and a second input of the second user input device that corresponds to the first device functionality in the set of common device functionalities, to:

retrieve a first input of the first user input device that corresponds to a first device functionality in the set of common device functionalities and a second input of the second user input device that corresponds to a second device functionality in the set of common device functionalities.

19. The system of claim 11, wherein the control circuitry is further configured to:

determine an exclusive set of device functionalities that are in the second set of device functionalities and not in the first set of device functionalities;

retrieve a third input of the second user input device that corresponds to a third device functionality in the exclusive set of device functionalities; and modify visual attributes of the third input of the second user input device to correspond to visual attributes of the first input of the first user input device.

20. The system of claim 11, wherein the first user input device is associated with a first user equipment device, and the second user input device is associated with a second user equipment device.

* * * * *